US009986596B2

(12) United States Patent
Stählin et al.

(10) Patent No.: US 9,986,596 B2
(45) Date of Patent: May 29, 2018

(54) CONNECTING CONTROL DEVICES AND THE V2X UNIT VIA WLAN OR BLUETOOTH, AND V2X UNIT WHICH HAS UPDATE MEMORY

(71) Applicant: Continental Teves AG & Co. oHG, Frankfurt (DE)

(72) Inventors: Ulrich Stählin, Eschborn (DE); Marc Menzel, Weimar (DE)

(73) Assignee: Continental Teves AG & Co. oHG (DE)

( * ) Notice: Subject to any disclaimer, the term of this patent is extended or adjusted under 35 U.S.C. 154(b) by 0 days. days.

(21) Appl. No.: 15/552,562

(22) PCT Filed: May 2, 2016

(86) PCT No.: PCT/EP2016/059735
§ 371 (c)(1),
(2) Date: Aug. 22, 2017

(87) PCT Pub. No.: WO2016/177661
PCT Pub. Date: Nov. 10, 2016

(65) Prior Publication Data
US 2018/0054843 A1 Feb. 22, 2018

(30) Foreign Application Priority Data
May 5, 2015 (DE) ........................ 10 2015 208 269

(51) Int. Cl.
*H04M 3/00* (2006.01)
*H04W 76/02* (2009.01)
(Continued)

(52) U.S. Cl.
CPC ........... *H04W 76/14* (2018.02); *H04W 4/008* (2013.01); *H04W 4/027* (2013.01); *H04W 4/046* (2013.01);
(Continued)

(58) Field of Classification Search
CPC ...... H04L 67/12; H04W 4/008; H04W 4/027; H04W 4/046; H04W 76/023; H04W 48/16; H04W 84/12
(Continued)

(56) References Cited

U.S. PATENT DOCUMENTS 8,451,786 B2    5/2013 Stahlin et al.
2008/0015748 A1*    1/2008 Nagy .................... G07C 5/008
701/31.4

(Continued)

FOREIGN PATENT DOCUMENTS

DE    102008037880 A1    3/2009
DE    102010029465 A1    12/2011
EP        2186379 B1    6/2011

OTHER PUBLICATIONS

International Search Report and Written Opinion for International Application No. PCT/EP2016/059735, dated Jul. 14, 2016, 10 pages.
(Continued)

*Primary Examiner* — William Nealon
(74) *Attorney, Agent, or Firm* — RatnerPrestia

(57) ABSTRACT

A vehicle system including a V2X unit for operating a vehicle-to-X communication, having a communications module for wireless data transfer, and a control device for controlling a user application, having a communications module for wireless data transfer which can be coupled with the communications module of the V2X unit, wherein the V2X unit and the control unit can be activated into a data transfer mode in order to couple the communications modules of the V2X unit and of the control device with each other for a data exchange.

26 Claims, 2 Drawing Sheets

(51) Int. Cl.
*H04W 4/00* (2018.01)
*H04W 48/16* (2009.01)
*H04W 4/04* (2009.01)
*H04W 4/02* (2018.01)
*H04L 29/08* (2006.01)
*H04W 84/12* (2009.01)

(52) U.S. Cl.
CPC .............. *H04W 4/80* (2018.02); *H04W 48/16* (2013.01); *H04W 76/023* (2013.01); *H04L 67/12* (2013.01); *H04W 84/12* (2013.01)

(58) Field of Classification Search
USPC ........................................................ 455/418
See application file for complete search history.

(56) References Cited

U.S. PATENT DOCUMENTS

| | | | | |
|---|---|---|---|---|
| 2011/0164594 A1* | 7/2011 | Stahlin | .................. | H04W 48/12 370/338 |
| 2012/0177061 A1* | 7/2012 | Stahlin | .................... | H04L 67/12 370/467 |
| 2015/0032291 A1* | 1/2015 | Lowrey | .................. | G01C 21/26 701/2 |

OTHER PUBLICATIONS

Abd-Elrahman, E., "A hybrid model to extend vehicular intercommunication V2V through D2D architecture," Feb. 16, 2015, pp. 754-759, 2015 International Conference on Computing, Networking and Communications (ICNC), IEEE, XP032752678, DOI: 10.1109/ICCNC.2015.7069441 [retrieved on Mar. 26, 2015].

* cited by examiner a vehicle system or a method whereby an economical and simple solution for data exchange between the V2X unit and a control device of the vehicle can be implemented.

CONNECTING CONTROL DEVICES AND THE V2X UNIT VIA WLAN OR BLUETOOTH, AND V2X UNIT WHICH HAS UPDATE MEMORY

CROSS REFERENCE TO RELATED APPLICATIONS

This application is the U.S. National Phase Application of PCT International Application No. PCT/EP2016/059735, filed May 2, 2016, which claims priority to German Patent Application No. DE 10 2015 208 269.5, filed May 5, 2015, the contents of such applications being incorporated by reference herein.

FIELD OF THE INVENTION

The invention relates to a vehicle system for transmission of data from a V2X unit to a control device via a wireless communications module, a method for operating such a vehicle system and a method for storing data in a vehicle system.

BACKGROUND OF THE INVENTION

From EP 2 186 379 B1, which is incorporated by reference a device is known for transmitting information in vehicle-to-vehicle communications based on IEEE802.11 standard WLAN, which involves both safety information based on the IEEE802.11p standard and non-safety-related information based on another IEEE802.11 standard being transmitted. To this end, the device comprises a WLAN chipset, which can be changed over by means of a control command between a first mode based on the IEEE802.11p standard and a second mode based on another IEEE802.11 standard. The device further comprises a control device which switches the mode of the WLAN chipset using a control command, wherein the control unit is equipped with an interface to a vehicle control system which is in the form of a driver assistance system, and wherein the control unit determines the vehicle state and performs a changeover of the mode of the WLAN chipset on the basis of the vehicle state.

DE 10 2008 037 880 A1 discloses a device and a method for transmitting information in WLAN-based vehicle-to-vehicle communication, wherein a WLAN chipset can be switched between a first mode according to the IEEE802.11p standard and a second mode according to another IEEE802.11 standard by means of a control command.

It is also known that V2X communication chips based on the 802.11p standard are used, able to transmit and receive in the 5 GHz band. For V2X only a certain range of this is used. It is, however, typically technically possible to also implement other WLAN versions in the 5 GHz band with the same transceiver, to some extent possibly with restrictions on the widths of the bands used (10 MHz vs. 40-80 MHz). Above all in situations in which no V2X communication is necessary, by way of example in the case of a parked vehicle, or one in which a mixed operation for a time is possible, by way of example during slow city driving or when waiting at traffic lights, it makes sense to use this synergy, by way of example in order to download infotainment data by WLAN into the vehicle during this time.

The bandwidth requirements for V2X and WLAN, however, are very different. V2X manages with 6 Mbit, whereas with WLAN even old versions were able to transmit 54 Mbit. This means that in the further distribution of the data in the vehicle the internal vehicle bus is subject to different requirements. For V2X, CAN-FD or CAN is sufficient—above all if, additionally, pre-processing takes place or possibly even the end client applications are directly processed in the ECU, which also contains the transceiver—whereas WLAN needs a high-speed bus such as, by way of example, Ethernet. Such high-speed bus systems, however, are expensive, especially if, for star cabling, switches or a router are also needed.

SUMMARY OF THE INVENTION

On that basis, the problem for the invention is to indicate a vehicle system or a method whereby an economical and simple solution for data exchange between the V2X unit and a control device of the vehicle can be implemented.

The problem is solved according to a first aspect of the invention.

According to an aspect of the invention, a vehicle system is proposed, comprising
 a V2X unit for operating vehicle-to-X communication, having a communications module for wireless data transfer, and
 a control device for executing a user application, having a communications module for wireless data transfer which can be coupled with the communications module of the V2X unit,
wherein the V2X unit and the control device can be activated in a data transfer mode in order to couple the communications modules for wireless data transfer of the V2X unit, and of the control device, with each other for data exchange.

The idea behind an aspect of the invention is to perform the exchange of non-V2X-relevant data via a direct wireless connection between the V2X unit and the respective control device, by way of example an infotainment ECU. This makes it unnecessary to provide a separate Ethernet interface for data transfer to the respective control devices or possibly to adapt the normal interfaces, such as CAN or CAN FD, separately for data transfer, in order to be able to provide the necessary data transfer rates. These interfaces remain available for the transfer of V2X data, but are unnecessary for the transfer of non-V2X-specific data. The wireless communications module of the V2X unit is preferably intended to be able to establish a wireless connection to an external network, but particularly a wireless connection with sufficient speed to the control devices. The connection to an external network can, by way of example, be established via WLAN or also via mobile phone connections according to the 3G or LTE standard, to name just a couple of examples.

In the broadest sense, a control device means a device which in driving mode requires user data. In the narrower sense, it refers to control devices, control units or ECUs installed in the vehicle and which accept driving or vehicle information. In the broader sense, it also refers to devices which are not directly installed in the vehicle, such as, for example, smartphones, but are able to interact with the vehicle.

An advantageous embodiment of the vehicle system according to the invention is characterised in that the V2X unit and the control device are coupled by means of an interface, particularly a CAN or CAN FD, wherein the data transfer mode can be activated by means of an activation signal from the V2X unit via the interface. As soon as the activation signal has been sent, a coupling of the wireless communications modules is performed, in order to establish a connection between the V2X unit and the control device. The interfaces that are kept available for V2X applications are particularly well-suited to the transfer of the activation signal.

An advantageous embodiment of the vehicle system according to the invention is characterised in that the data transfer mode can be activated as a function of the state of terminal KL15. The state of terminal KL15 offers a very simple and reliable way of establishing the ignition state of the vehicle, for which reason it is a particularly good trigger for activation of the data transfer mode. In the open or off state of the terminal KL15, e.g. ignition off, the data transfer mode can then be activated. Accordingly, in a closed or on state of terminal KL15 the data transfer mode can be reactivated.

An advantageous embodiment of the vehicle system according to the invention is characterised in that in the off state of the terminal KL15 data for the V2X communication can be transferred via the control device by means of the communications modules. With this embodiment, it is possible in an advantageous manner to dispense with a connection of the V2X unit to a data bus of a vehicle and accordingly with a separate data bus or CAN interface, making the V2X unit more interesting as a retrofitting option. This embodiment defines two states, that of a V2X unit, namely a V2X mode if the terminal KL15 is on, and of a data transfer mode if the terminal KL15 is off. The transfer of data, be it V2X or other data, takes place for this embodiment in both cases via the wireless communications module, wherein the data bus or CAN data necessary for V2X are provided by means of the communications modules for wireless data transfer of the control device which is connected to the data bus or CAN bus.

An advantageous embodiment of the vehicle system according to the invention is characterised in that the communications module of the V2X unit is configured for simultaneous operation of the V2X communication and coupling with a control device. In this way, particularly flexible control of the data transfer mode is possible. The control device is preferably a control device internal to or inside the vehicle.

An advantageous embodiment of the vehicle system according to the invention is characterised in that the V2X unit has a plurality of communications channels for simultaneous sending and receiving of data.

An advantageous embodiment of the vehicle system according to the invention is characterised in that the communications module of the V2X unit and the communications module of the control device each comprise a WLAN communications chip.

An advantageous embodiment of the vehicle system according to the invention is characterised in that the WLAN communications chip is configured such that it is designed to implement a number of WLAN standards or IEEE 802.11 standards.

An advantageous embodiment of the vehicle system according to the invention is characterised in that the communications module of the V2X unit and the communications module of the control device each comprise a Bluetooth communications chip.

An advantageous embodiment of the vehicle system according to an aspect of the invention is characterised in that the V2X unit comprises a volatile or non-volatile memory for intermediate storage of data, particularly software modules and software updates. The memory can be provided as a separate memory or also as additional space intended for downloadable data. In this way, the memory serves as a buffer memory in the event that a rapid provision of the data to the control units is impossible. Such circumstances can arise due to differing transfer speeds to the individual control devices or also if control units are switched off with the vehicle at a standstill.

Software updates can mean, inter alia, the following:
program code updates;
updates of parameters, by way of example for chassis adjustments, engine controller, telephone numbers for manufacturer's services, etc.;
updates for data, such as, for example, card data, images for the HMI, sounds for the HMI, etc.;
new programs.

The above definition is not exclusive and merely provides a list of advantageous examples. The invention is also understood to extend to a use of a memory for intermediate storage of data obtained via the V2X unit, particularly downloaded data as mentioned above.

An advantageous embodiment of the vehicle system according to the invention is characterised in that the memory is a non-volatile memory, particularly a flash memory. In this way, intermediate storage is maintained even if the power supply to the V2X unit is interrupted.

An advantageous embodiment of the vehicle system according to the invention is characterised in that the memory is a volatile memory, particularly a RAM module. The volatile memory can preferably be used alternatively or additionally to the above exemplary embodiment of a non-volatile memory, wherein the vehicle system in this case preferably ensures a power supply for the V2X unit or the volatile memory, in order to maintain the data in the memory. Particularly in battery-operated vehicles, having a larger storage battery than vehicles with combustion engines, this embodiment could offer further advantages.

An advantageous embodiment of the vehicle system according to the invention is characterised in that the V2X unit has a storage battery for supplying the V2X unit with energy. This would allow an emergency power supply for the V2X to be implemented.

The problem is further solved according to a second aspect of the invention by means of a method for operating a vehicle system containing
a V2X unit for operating vehicle-to-X communication, having a communications module for wireless data transfer, and
a control device for controlling a user application with a wireless communications module, that can be coupled with the communications module of the V2X unit, having the following steps:
identifying a predefined driving situation for activation of a data transfer mode in the V2X unit;
activating the data transfer mode in the V2X unit;
transmitting an activation signal to the control device for activating the data transfer mode;
coupling the communications modules for wireless data transfer of the V2X unit and of the control device.

An advantageous embodiment of the method according to the invention is characterised in that the activation signal is transmitted via an interface, particularly CAN or CAN FD.

An advantageous embodiment of the method according to the invention is characterised in that the data transfer mode is activated as soon as the terminal KL15 adopts an open state.

An advantageous embodiment of the method according to the invention is characterised in that the communications modules of the V2X unit and the control device comprise a WLAN and/or a Bluetooth communications chip, and the V2X unit and the control device are coupled with each other via WLAN and/or Bluetooth.

The method preferably also comprises the steps of:
identifying a predefined driving situation for deactivating the data transfer mode;
decoupling the connection between the communications modules by means of the V2X unit.

This problem is further solved according to a third aspect of the invention by means of a method for storing data in a vehicle system containing
a V2X unit for operating vehicle-to-X communication with a communications module for wireless data transfer and a memory for intermediate storage of data, particularly software modules and software updates, and
a control device for controlling a user application with a communications module for wireless data transfer, that can be coupled with the communications module of the V2X unit, having the following steps:
identifying a predefined driving situation for activating a data transfer mode in the V2X unit;
activating the data transfer mode in the V2X unit and activating the communications module for the connection to an external network;
searching for available external networks for establishing a connection to a server;
connecting with the network, where a network is available, or terminating the data transfer mode, if no network is available;
downloading the data from the server; and
intermediate storage of the data in the memory of the V2X unit.

An advantageous embodiment of the method according to the invention is characterised in that the method is performed in the off state of the vehicle, and wherein the V2X unit is switched off, if no network is available.

An advantageous embodiment of the method according to the invention is characterised in that the V2X unit is switched off when the memory is full or all envisaged data have been intermediately stored.

An advantageous embodiment of the method according to the invention is characterised in that the V2X unit, after the vehicle is switched on, checks if the memory is full.

An advantageous embodiment of the method according to the invention is characterised in that the V2X unit makes the data available to corresponding systems, control units, sensors or modules of the vehicle.

An advantageous embodiment of the method according to the invention is characterised in that the memory is cleared once the making available of the data has been successfully completed.

An advantageous embodiment of the method according to the invention is characterised in that the making available of the data takes place via a vehicle interface, particularly a CAN, CAN FD, Flexray or a low speed bus.

An advantageous embodiment of the method according to the invention is characterised in that the making available of the data takes place via a WLAN communications chip or a Bluetooth communications chip of the communications module of the V2X unit.

An advantageous embodiment of the method according to the invention is characterised in that the making available of the data takes place following a confirmation by a driver.

An advantageous embodiment of the method according to the invention is characterised in that the making available of the data takes place in stages, when there is insufficient memory for intermediate storage of the data.

An advantageous embodiment of the method according to the invention is characterised in that the communications module of the V2X unit has two antennas for simultaneous operation of the V2X communication and coupling with a control device internal to the vehicle, and wherein the antennas are used one after the other or simultaneously, in order to make available the data from the memory.

BRIEF DESCRIPTION OF THE DRAWINGS

An aspect of the invention is described in more detail below using an exemplary embodiment and using figures. These show as follows.

DETAILED DESCRIPTION OF THE PREFERRED EMBODIMENTS

Figure 1:
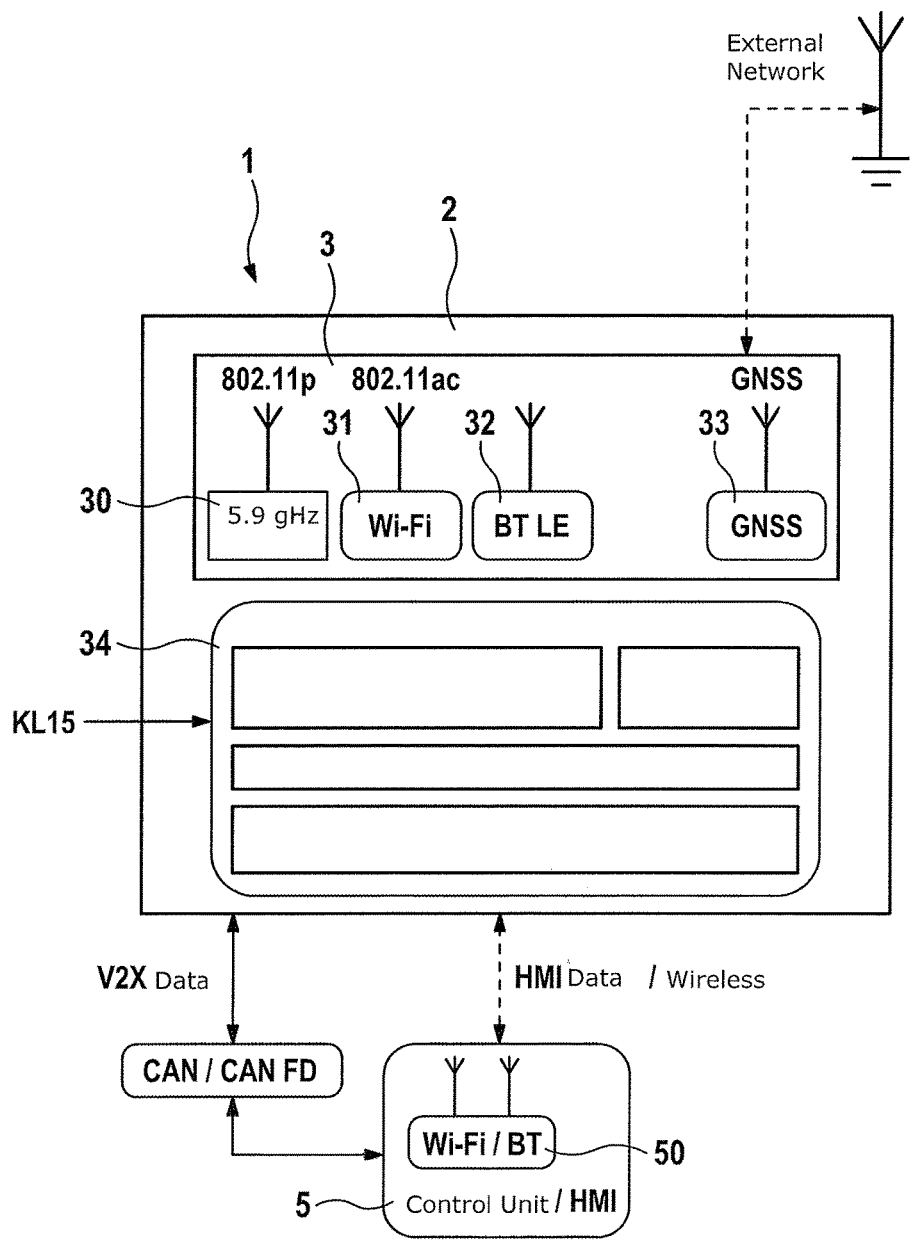
FIG. 1 a schematic representation of the architecture of a vehicle system according to the invention according to a first exemplary embodiment, and FIG. 2 a perspective view of a V2X unit according to the first exemplary embodiment.

FIG. 1 shows a vehicle system 1 containing a unit 2 for operating vehicle-to-X communication, V2X or V2X unit 2 for short, with a wireless communications module 3. The vehicle system 1 further has a control device 5 for controlling a user application, equipped with a wireless communications module 50 and via which the control device 5 can be coupled with the communications module 3 of the V2X unit. The V2X unit 2 and the control device 5 are configured such that in a data transfer mode they can be activated or are switchable, in order to couple the communications modules 3, 50 of the V2X unit and of the control device with each other for a data exchange. The data transfer mode should be considered separately from a V2X mode and primarily serves to distribute user data in the vehicle.

The communications module 3 is advantageously configured so that the V2X mode and the data transfer mode can be simultaneously operational, without this being absolutely essential. To this end the communications module 3 has a plurality of communications chips 30, 31, 32 with corresponding antennas. At the same time, the V2X unit 2 is equipped with a processing unit 34, having a plurality of communications channels for simultaneously sending and receiving data.

The communications module 3 has a WLAN communications chip 30 with an antenna (shown symbolically with 3 radio paths), operating according to the IEEE 802.11p standard and intended to perform the V2X communication. In addition, a further WLAN or Wi-Fi communications chip 31 is provided, operating according to the IEEE 802.11ac standard. It would also be possible to use one of the other WLAN non-V2X-specific standards for data transfer. Apart from this WLAN communications chip 31 the communications module 3 also comprises a Bluetooth LE communications chip 32 with a corresponding antenna. Normally the communications module 3 also has a GNSS receiver 33 for receiving satellite data for global satellite navigation.

The V2X unit 2 is coupled to the control device 5. In this exemplary embodiment, the control device 5 is an infotainment and vehicle control unit having an input interface for a user and a display for showing information, such as, for example, traffic alerts or similar. The control device 5 is connected via an interface, here a CAN or CAN FD interface, with the V2X unit. Furthermore, the control device 2 has its own communications module 50 with a WLAN and Bluetooth communications chip 50. Via this, the control device can be coupled with the WLAN and Bluetooth communications chip 31, 32 of the V2X unit 2, in order to exchange data in the data transfer mode. Activation of the data transfer mode takes places by means of an activation signal, generated by the V2X unit and preferably transmitted via the CAN interface.

Alternatively, this mode can also be activated or deactivated when a change of state of the terminal KL15 occurs. To this end, the processing unit 34 is provided with a corresponding signal input. According to this alternative not only pure application data, but also data for V2X communication or V2X-relevant data can be transmitted to the control device by means of the wireless communications modules 31, 32.

According to an aspect of the invention, the vehicle system comprising the V2X unit 2 and the control device 5 is operated in such a way that first the V2X unit 2 checks or identifies if a predefined driving situation exists, in which switching to the data transfer mode is possible. This typically involves situations in which the vehicle is not moving, or only slowly, or where there is little driving activity. This can be identified using the data processed in the V2X unit 2, the amount of data or the existence of certain data types. An external signal can also be used to identify a vehicle state such as, for example, the KL15 signal.

If a corresponding driving situation exists and/or if there is a need to activate the data transfer mode, because a data request from the control device exists, the data transfer mode in the V2X unit 2 is activated. This transmits an activation signal to the control device 5 for activating the data transfer mode via the CAN interface. Simultaneously, or shortly afterwards, the internal WLAN or Bluetooth chip 31, 32 is activated, ideally in the 2.4 GHz range, so that these can be coupled with the communications module 50 of the control device 5. The V2X unit 2 and the control device 5 can be coupled via WLAN and/or Bluetooth with each other.

If the vehicle is moved again or if another vehicle situation arises, then this change is similarly identified and the data transfer mode deactivated and the connection between communications modules 3, 50 by means of the V2X unit is terminated.

The exemplary embodiment described here also allows the data transfer mode to be operated in parallel with the V2X mode. In this way, it is similarly possible to distribute data by internal WLAN or Bluetooth. This is particularly relevant if, by way of example, the data are also to be sent to smartphones inside the vehicle. This can be used to supply suitable apps on the smartphones with data which, by way of example, can be used for augmented reality applications.

With the method described retrofittable V2X units can be implemented. These are connected with the CAN bus, in order to obtain the necessary vehicle data. The CAN bus does not have to be altered for this. The data can then be sent to units inside the vehicle, by way of example to smartphones or tablets or also to permanently installed screens, which do not have to be cabled to the V2X unit, however.

Figure 2:
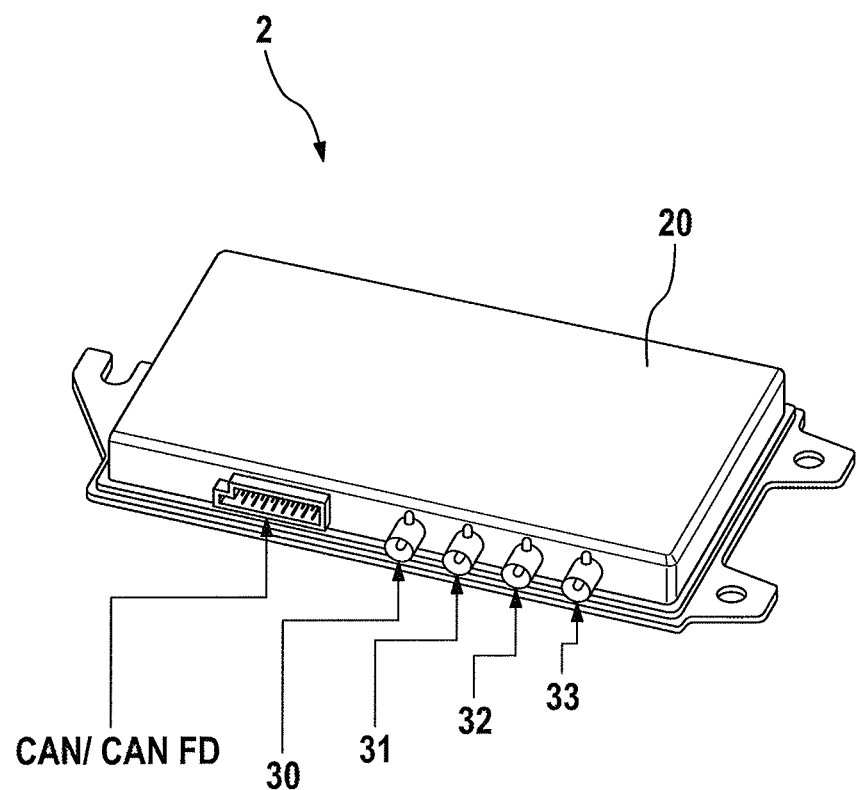

In the following a further usage scenario is described. The V2X unit 2 is installed in a vehicle remote from a control device 5, since it is in the vicinity of the antennas. In FIG. 2, the V2X unit 2 is shown in a perspective view.

The V2X unit 2 comprises a housing 20, in which the processing unit 34, the communications chips 30, 31, 32 and the GNSS receiver 33 are accommodated on a printed circuit board. On the outside of the housing 20 there are a number of connections, via which the communications chips 30, 31, 32 and the GNSS receiver 33 can be connected with the antennas. The antennas are generally located in the roof adjacent to the rear window of the vehicle.

The control device 5 in the form of the infotainment ECU, on the other hand, is located in the vicinity of the central console. The infotainment ECU has an internal Bluetooth node, via which a mobile telephone can be connected to the vehicle. The V2X unit 2 is therefore also equipped with a Bluetooth node and an internal antenna. In the V2X mode the V2X unit 2 processes the end user applications and sends the V2X data via the CAN or CAN FD, resulting from the end user applications. In parking mode, the V2X unit 2 switches to normal external WLAN and simultaneously signals this via the CAN. Thereupon the infotainment ECU switches to the internal communications mode or data transfer mode and connects by means of Bluetooth or WLAN with the V2X unit. Via this connection, the external WLAN communication is then passed on from the V2X unit to the infotainment ECU, by way of example in order to transfer music albums to the vehicle. By means of Bluetooth 3.0 or 4.0 up to 24 Mbit/s is possible here. With WLAN higher data transfer rates are possible. As soon as the vehicle leaves the parking mode, the V2X unit signals via the CAN the change in the communication mode and terminates the transmission by means of internal Bluetooth or WLAN.

Through the vehicle system or method according to the invention the costs of the high-speed bus cabling are saved, including bus transceivers, EMC circuitry, and so on. Other synergies can also be used, by way of example if WLAN or Bluetooth already exists in receiving control devices.

In the following a variant of the abovementioned exemplary embodiments is described. According to this variant, the V2X unit 2 has a memory for intermediate storage of data. This is used for intermediate storage of software modules and software updates, downloaded in data transfer mode. The storage concerned is a non-volatile memory, such as, for example, flash memory. It is also conceivable, however, to use volatile memory, such as RAM modules. In this way, a dedicated interface such as, for example, Ethernet, can be dispensed with, in order to transmit the data, or make it available, to the control units. The memory can, by way of example, be accommodated in the processing unit 34. This may involve a dedicated memory for the data or an additional partition of a memory of the processing unit 34.

This variant of the exemplary embodiment according to the invention can be operated in the most general form as follows:
  identifying a predefined driving situation for activating a data transfer mode in the V2X unit;
  activating the data transfer mode in the V2X unit and activating the communications module for connection to an external network;
  searching for available external networks to establish a connection with a server;
  connecting with the network, where a network is available, or terminating the data transfer mode if no network is available;
  downloading the data from the server; and
  intermediate storage of the data in the memory of the V2X unit.

In the following further details of the individual steps are described. According to these, an update procedure runs as follows:
  the vehicle is parked following a journey and possibly placed in parking mode;
  the V2X ECU or V2X unit 2 is thereby automatically switched from V2X to WLAN;

all further control units in the vehicle are switched off according to the normal pattern, including after run, if the ignition is deactivated;

if the V2X ECU is able to select a WLAN, it connects with the update server. If not, the V2X ECU switches off with any necessary after run;

if updates are available on the update server, the V2X ECU loads these into its flash memory. Then (or if no update is available) the V2X ECU switches off with any necessary after run;

if the vehicle is restarted and thereby the V2X ECU is also activated, the latter checks if updates are available in the flash memory. If so, these are notified via a low-speed bus (CAN, CAN-FD, Flexray, etc.) to the corresponding control devices;

if the vehicle is in a mode that allows the updates to be imported, then the control units concerned request the updates from the V2X ECU and the V2X ECU distributes these accordingly via the low-speed bus. This mode can, by way of example, be present once the vehicle has been switched on, the driver has been alerted to the pending updates and has confirmed these updates;

if the control device concerned signals the successful completion of the update, the data required for this are deleted from the flash memory of the V2X ECU.

If less emphasis is placed on power conservation, a volatile memory, such as, by way of example, a RAM memory, can be used and intermediate storage only take place in order to distribute the updates directly by low-speed bus. For this, however, all participating control units must be supplied with power at all times.

Instead of the low-speed bus, for the transmission of the data envisaged for an update to a control device, alternatively or additionally the communications chip of the V2X ECU can also be used. To do this the latter must be placed in the WLAN mode and be connected with an internal antenna, by way of example via a HF switch, instead of with the external antenna. The control device which receives the data must of course similarly be equipped with WLAN and an associated internal antenna. This internal WLAN communication can be used both with a flash memory, thus once the vehicle has been switched off and on again, or also with the volatile memory. When the volatile memory is used, it is filled with data received via the external antenna and then during or after transmission of the data stored therein, cleared again, and then, if necessary, filled again via the external antenna, and so on. If the size of the intermediate buffer is not big enough for the complete update, toggling of the WLAN mode can be performed multiple times, in order to transfer the update step-by-step.

If the V2X communications chip is equipped with Bluetooth, instead of or to supplement WLAN, Bluetooth can also be used for transmission at one or more points in the process described.

The memories can be bypassed and the updates performed directly in a workshop, where both the power supply and the connection with the update server throughout the update process can be guaranteed. Ideally this mode change in the update process is performed either by a suitably identified update server, by way of example with corresponding security certificates, or by a corresponding message being sent via the WLAN communication to the V2X ECU.

Instead of dedicated flash or RAM modules, flash or RAM areas incorporated in the ECU can be used, where at the time of the update these are not needed for any other tasks. This is particularly appropriate with RAM, since utilisation of this varies greatly depending on the current application.

It can generally be said that vehicle-to-X communication particularly means direct communication between vehicles and/or between vehicles and infrastructure facilities. By way of example, therefore, vehicle-to-vehicle communication or vehicle-to-infrastructure communication may be involved. Where in the context of this application reference is made to communication between vehicles, this can essentially take place by way of example in the context of vehicle-to-vehicle-communication, which typically takes place without the intermediary of a mobile telephone network or a similar external infrastructure and which therefore can be differentiated from other solutions which, by way of example, are based on a mobile telephone network. By way of example, vehicle-to-X communication can use the standards IEEE 802.11p or IEEE1609.4. Vehicle-to-X communication can also be referred to as C2X communication. The subareas can be referred to as C2C (Car-to-Car) or C2I (Car-to-Infrastructure). However, the invention does not expressly exclude vehicle-to-X communication with the intermediary of, by way of example, a cellular network. Vehicle-to-vehicle communication can, by way of example, also take place via LTE.

The claims in the application do not mean that the achievement of more far-reaching protection has been abandoned.

Where in the course of the method it transpires that a feature or a group of features is not absolutely necessary, then the applicant here and now seeks a wording of at least one independent claim, which no longer comprises the feature or group of features. It may, by way of example, be a matter here of a sub-combination of a claim existing on the application date or a sub-combination restricted by further features of a claim existing on the application date. Such newly worded claims or combinations of features are understood to be covered by the disclosure of this application.

It is further pointed out that configurations, features and variants of the invention, which are described in the various embodiments or exemplary embodiments and/or shown in the figures, can be combined freely with one another. Individual or multiple features are freely exchangeable with one another. Resulting combinations of features are understood to be covered by the disclosure of this application.

References back to dependent claims shall not mean that the achievement of independent, objective protection for the features of the subclaims referred back to has been abandoned. These features also can be freely combined with one another.

Features which are merely disclosed in the description or features which are disclosed in the description or in a claim only in combination with other features, can basically be of independent and essential importance to the invention. They may therefore also be used individually for delimitation from the state of the art in claims.

The invention claimed is:

1. A vehicle system comprising:
 a V2X unit for operating vehicle-to-X communication, having a communications module for wireless data transfer; and
 a control device for executing a user application, having a communications module for wireless data transfer, which can be coupled with the communications module of the V2X unit;
 wherein the V2X unit and the control device can be activated in a data transfer mode, in order to couple the communications modules for wireless data transfer of the V2X unit, and the control device, with each other for a data exchange, and wherein the communications module of the V2X unit is configured for simultaneous operation of the V2X communication and coupling with a control device.

2. The vehicle system according to claim 1, wherein the V2X unit and the control device are coupled by a CAN or a CAN FD interface, wherein the data transfer mode can be activated by an activation signal of the V2X unit via the interface.

3. The vehicle system according to claim 1, wherein the data transfer mode can be activated as a function of a state of a terminal of the V2X unit.

4. The vehicle system according to claim 3, wherein in the off state of the terminal data for the V2X communication can be transferred via the control device by the communications modules.

5. A vehicle system comprising:
a V2X unit for operating vehicle-to-X communication, having a communications module for wireless data transfer; and
a control device for executing a user application, having a communications module for wireless data transfer, which can be coupled with the communications module of the V2X unit;
wherein the V2X unit and the control device can be activated in a data transfer mode, in order to couple the communications modules for wireless data transfer of the V2X unit, and the control device, with each other for a data exchange, and
wherein the V2X unit has a plurality of communications channels for simultaneous sending and receiving of data.

6. The vehicle system according to claim 1, wherein the communications module of the V2X unit and the communications module of the control device each comprise a WLAN communications chip.

7. The vehicle system according to claim 6, wherein the WLAN communications chip is configured such that it is designed to implement a number of WLAN standards.

8. The vehicle system according to claim 1, wherein the communications module of the V2X unit and the communications module of the control device each comprise a Bluetooth communications chip.

9. The vehicle system according to claim 1, wherein the V2X unit comprises a volatile or non-volatile memory for intermediate storage of data.

10. The vehicle system according to claim 1, wherein the V2X unit has a storage battery for supplying the V2X unit with energy.

11. A method for operating a vehicle system containing a V2X unit for operating vehicle-to-X communication, having a communications module for wireless data transfer, and
a control device for executing a user application, having a communications module for wireless data transfer, which can be coupled with the communications module of the V2X unit,
the method comprising:
identifying a predefined driving situation for activation of a data transfer mode in the V2X unit;
activating the data transfer mode in the V2X unit;
transmitting an activation signal to the control device for activating the data transfer mode; and
coupling the communications modules for wireless data transfer of the V2X unit and of the control device.

12. The method according to claim 11, wherein the activation signal is transmitted via a CAN or CAN FD interface.

13. The method according to claim 11, wherein the data transfer mode is activated as soon as a terminal of the V2X unit adopts an open state.

14. The method according claim 11, wherein the communications modules of the V2X unit and the control device comprise a WLAN and/or a Bluetooth communications chip, and the V2X unit and the control device are coupled with each other via WLAN and/or Bluetooth.

15. The method according to claim 11, further comprising:
identifying a predefined driving situation for deactivating the data transfer mode and;
decoupling the connection between the communications modules by the V2X unit.

16. A method for storing data in a vehicle system containing a V2X unit for operating vehicle-to-X communication with a communications module for wireless data transfer and a memory for intermediate storage of data, particularly software modules and software updates, and
a control device for controlling a user application with a communications module for wireless data transfer, which can be coupled with the communications module of the V2X unit, the method comprising:
identifying a predefined driving situation for activating a data transfer mode in the V2X unit;
activating the data transfer mode in the V2X unit and activating the communications module for the connection to an external network;
searching for available external networks for establishing a connection to a server;
connecting with the network, where a network is available, or terminating the data transfer mode, if no network is available;
downloading the data from the server; and
intermediate storage of the data in the memory of the V2X unit.

17. The method according to claim 16, wherein the method is performed in the off state of the vehicle, and wherein the V2X unit is switched off, if no network is available.

18. The method according to claim 16, wherein the V2X unit is switched off if the memory is full or all envisaged data have been intermediately stored.

19. The method according to claim 16, wherein the V2X unit, after the vehicle is switched on, checks if the memory is full.

20. The method according to claim 19, wherein the V2X unit makes the data available to corresponding systems, control units, sensors or modules of the vehicle.

21. The method according to claim 20, wherein the memory is cleared once the making available of the data has been successfully completed.

22. The method according to claim 16, wherein the making available of the data takes place via a CAN, CAN FD, Flexray or a low speed bus vehicle interface.

23. The method according to claim 16, wherein the making available of the data takes place via a WLAN communications chip or a Bluetooth communications chip of the communications module of the V2X unit.

24. The method according to claim 16, wherein the making available of the data takes place following a confirmation by a driver.

25. The method according to claim 16, wherein the making available of the data takes place in stages, when there is insufficient memory for intermediate storage of the data.

26. The method according to claim 25, wherein the communications module of the V2X unit has two antennas for simultaneous operation of the V2X communication and coupling with a control device internal to the vehicle, and wherein the antennas are used one after the other or simultaneously, in order to make available the data from the memory.

\* \* \* \* \*